No. 699,211. Patented May 6, 1902.
DE WITT C. MOSHER.
BARREL FILTER.
(Application filed Feb. 3, 1902.)
(No Model.)

UNITED STATES PATENT OFFICE.

DE WITT C. MOSHER, OF COLORADO CITY, COLORADO, ASSIGNOR TO CHARLES M. MACNEILL, OF COLORADO SPRINGS, COLORADO.

BARREL-FILTER.

SPECIFICATION forming part of Letters Patent No. 699,211, dated May 6, 1902.

Application filed February 3, 1902. Serial No. 92,442. (No model.)

*To all whom it may concern:*

Be it known that I, DE WITT C. MOSHER, a citizen of the United States, residing at Colorado City, in the county of El Paso and State of Colorado, have invented certain new and useful Improvements in Barrel-Filters, of which the following is a specification.

My invention relates to barrel-filters, and has for its object to provide an improved and simplified construction of such filters; and to these ends my invention consists in the various features of construction and arrangement of parts having the general mode of operation substantially as hereinafter more particularly pointed out.

Figure 1:
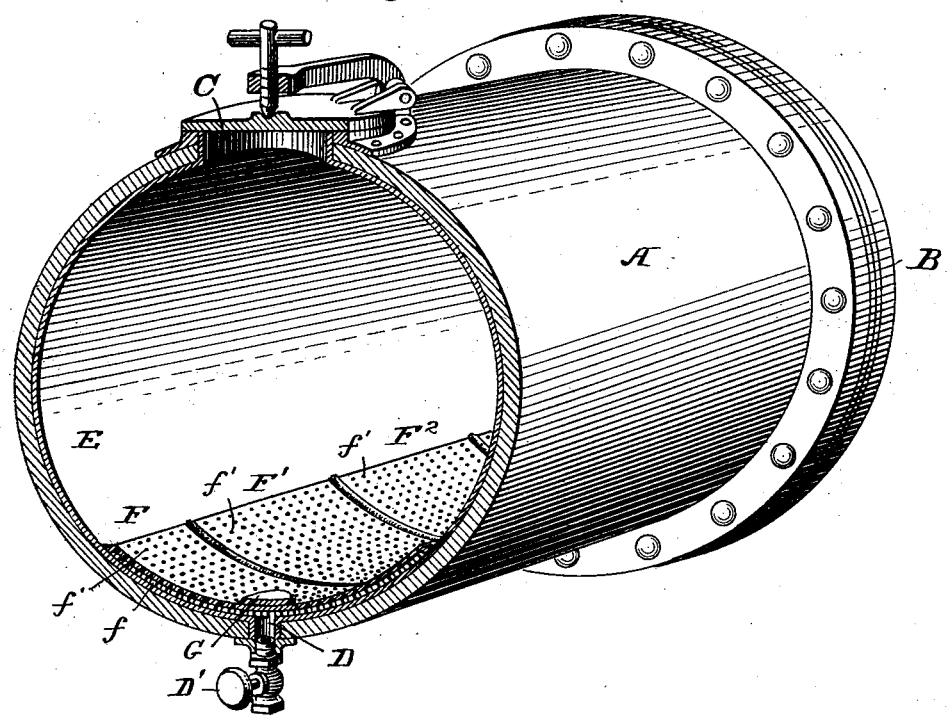
Figure 2:
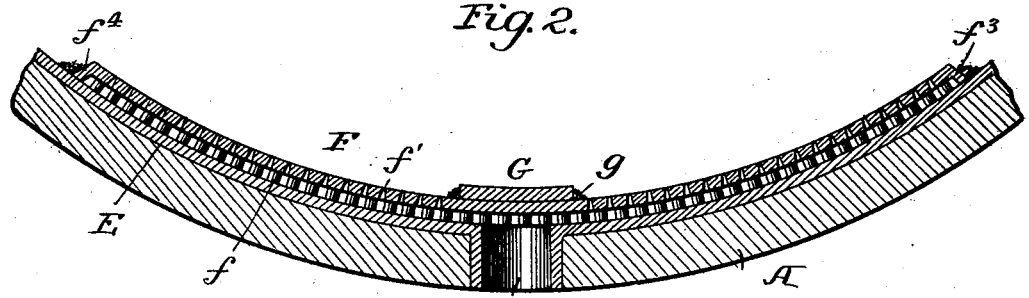
Figure 3:
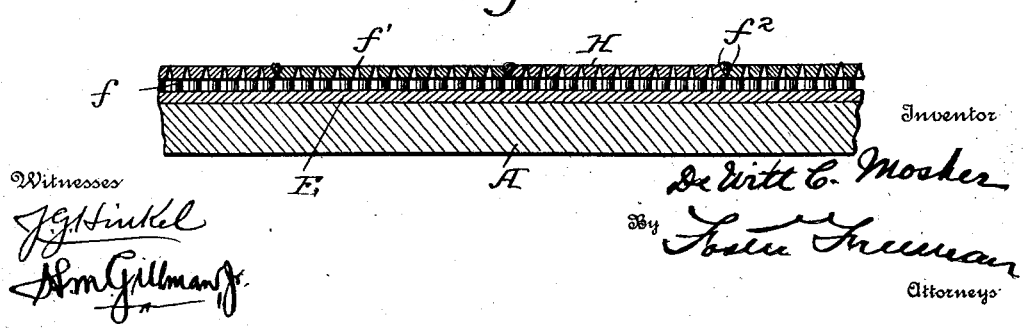

Referring to the accompanying drawings, Figure 1 is a sectional perspective view of a filter-barrel, showing my improved filter installed therein. Fig. 2 is an enlarged transverse section of a portion of the barrel and filter, and Fig. 3 is an enlarged sectional view through the longitudinal axis of the barrel.

While my invention may be used for any purpose for which it is adapted and may be modified in details of structure and arrangement to adapt it for various purposes, it is primarily intended for use in connection with chlorination-barrels. The general purpose of the invention is to provide a simple, cheap, and effective structure which can be applied to and used in such barrels and which shall occupy relatively little space therein and still furnish a satisfactory means of filtering and one which is not liable to get out of order.

It is well known that chlorination-barrels as generally used are made of metal and are so arranged as to be bodily rotated and have means for introducing the ore and chemicals and for delivering the filtered material. These barrels are lined with some resisting material, usually lead, and the filter is arranged to extend lengthwise of the barrel and to occupy a position against the inside lining, which extends more or less around the inner circumference thereof, and the barrels most generally in use are provided with what is known as a "platform-filter," such platform-filter occupying a considerable space in the barrel, thereby reducing the amount of material which can be treated, and they are open to other objections, which need not be specified, but which it is desirable to overcome.

Referring to the embodiment of my invention illustrated in the drawings, A represents the barrel, which, as before stated, may be of metal or other material and is provided with heads, one, B, of which is shown, and is also provided with suitable means of ingress for the material, as the manhole C, and a discharge-outlet, as D, controlled by a suitable valve, as D'. The barrel, as is well known, is usually provided with trunnions and means for rotating it, which are not shown in the drawings. The interior of the barrel is lined throughout with some resisting material E, as lead, and the barrel as thus far described is of the usual construction.

My improved filter comprises a number of independent filter plates or sections, which are made of some resisting material, preferably lead, and which are introduced into the barrel, as through the manhole C, and are subsequently united to each other and to the lining E of the barrel by being burned thereto. The plates or sections may be bent to conform to the contour of the barrel before being introduced, or subsequently when in place they are bent so as to conform to the general circular contour of the barrel, and preferably the plates or series of plates joined together extend throughout the internal longitudinal length of the barrel. While these plates may be of various sizes with relation to the barrel and to each other, I have found that in what may be termed a "ten-ton barrel" it is convenient to make them rectangular in shape and of about sixteen inches in width and seventy-two inches long, and in the drawings the plates F F' F² are so made. Each plate or section F is provided on its under surface or the surface adjacent the lead lining of the barrel with a series of studlike projections $f$, and these are preferably formed integral with the plate and are uniformly distributed throughout its under or outer surface. The plate is further provided with a series of perforations $f'$, extending through the body of the plate between the projections $f$, and these perforations are preferably tapering, with their smallest ends on the upper or inner face of the plate and their enlarged ends extending toward the outer edge of the plate and between the projections $f$. By making the projections relatively small, so that there is a large number on the plate and there can, therefore, be a large number of perforations between them I am enabled to dispense with the usual lead cloth or other filtering cloth used in chlorination-barrels and utilize the lead plate itself as a filtering medium, thus avoiding the necessity of making a supporting-platform and covering it with a filtering-surface. In other words, in my filter I combine the support and filter in a single structure or section, and by uniting a number of these sections a filter of the proper size can be made and one which will be self-supporting and withstand the pressure and shocks due to the charge of ore or other material in the barrel as it is rotated in the process of chlorination or otherwise. These plates or sections are provided at their longitudinal sides with beveled edges $f^2$, so that when the plates are arranged side by side a V-shaped groove is provided between the adjacent plates, by means of which they can readily be united by burning or soldering, as indicated. The ends of the sections or plates are also suitably formed, so that they can be united to the lead lining of the barrel, and I have shown the ends of the plates F as being provided with a transverse rib $f^3$, which may be burned to the lining E, as indicated, forming a close joint, preventing the flow of liquid beneath the filter except such as passes through the openings or perforations $f'$. This rib $f^3$ may be beveled or inclined, as shown at the right-hand side of Fig. 2, or it may be at right angles to the plane of the filter, as shown at the left-hand side at $f^4$, or it may be of any other form which will serve to readily be united with the lead lining by means of lead burning or soldering.

This filter, of course, extends over the outlet D, and in order to protect the filter, as it would not be properly supported at the outlet, I provide an additional plate G of resisting material, which may be attached to the filter section or sections and burned thereto, as at $g$.

While other means of strengthening the filter-plate adjacent to the outlet might be used, this furnishes a simple and effective means and enables the use of uniform filter-sections, as the additional plate G can be readily attached to the particular filter-section which is over the outlet and the parts thereby strengthened.

The advantages of such a construction as that shown and described will be apparent to those skilled in the art. In the first place, the plates can be readily made, as by casting or otherwise, and then when introduced into the barrel through the manhole, as indicated, can be bent to conform to the exact contour of the inner side of the lining of the barrel, and when they are arranged in order they can be united to each other by burning or soldering at the V-shaped recesses made by the longitudinal edges of the plates, and they can also be firmly and securely united to the barrel-lining by being burned along their ends. Furthermore, the filter furnishes an extended surface, with many minute perforations or filtering-points, which permit the flow of the liquid therethrough between the bodies of the plates and inner lining, and the projections furnish a substantial support for the body of the plate and at the same time permit a free flow of the liquid from any and all of the perforations toward the outlet D, not only circumferentially, but lengthwise of the barrel. Furthermore, the inner face of the plates is smooth and free from projections and provided with minute filtering-perforations, through which the liquid can readily percolate.

From the above description those familiar with the art will understand the principles of construction and arrangement of my filter and be able to utilize it to the best advantage, adapting it to the particular form or size of barrel or other vessel to which it is applied.

Having thus explained my invention, without limiting myself to the precise details of construction shown and described, what I claim is—

1. A barrel-filter comprising filter-sections, the plates having projections on their outer sides and perforations through the plates arranged between the projections and having beveled longitudinal edges, whereby the adjacent sides of the sections may be united by burning, substantially as described.

2. The combination with the lead lining of a filter-barrel, of filter sections or plates having projections on their outer sides and perforations through the plates between the projections, and having bent ends whereby the plates may be united to the lining by burning, substantially as described.

3. The combination with the lead lining of a filter-barrel, of filter sections or plates having projections on their outer sides and perforations through the plates between the projections, the plates having beveled longitudinal edges and bent ends, whereby the plates may be united together and to the lead lining by burning, substantially as described.

4. The combination with the lead lining of a filter-barrel having an opening, of filter sections or plates having projections on their outer sides and perforations through the plates between the projections, the plates being adapted to be burned together at their edges and to the lining at their ends, and a strengthening-plate adapted to extend over the opening in the barrel and to be secured to a section by burning, substantially as described.

5. In a barrel-filter, a filter-section having stud projections on one side, tapering perforations through the body of the section between the projections, and provided with beveled edges whereby various sections may be united to form a filter having a plain, perforated inner surface, substantially as described.

In testimony whereof I have signed my name to this specification in the presence of two subscribing witnesses.

DE WITT C. MOSHER.

Witnesses:
J. H. NELSON,
CHAS. N. SNYDER.